UNITED STATES PATENT OFFICE.

FREDRIK W. DE JAHN, OF NEW YORK, N. Y., ASSIGNOR TO GENERAL CHEMICAL COMPANY, OF NEW YORK, N. Y., A CORPORATION OF NEW YORK.

PRODUCTION OF AMMONIA.

1,151,537.   Specification of Letters Patent.   Patented Aug. 24, 1915.

No Drawing.   Application filed February 21, 1914. Serial No. 820,186.

*To all whom it may concern:*

Be it known that I, FREDRIK W. DE JAHN, a subject of the King of Norway, and a resident of the borough of Manhattan, city, county, and State of New York, have invented certain new and useful Improvements in the Production of Ammonia, of which the following is a specification.

My invention relates to the synthetic production of ammonia and more particularly to a new catalytic agent therefor, its production and use.

I have discovered that if a gaseous mixture containing nitrogen and hydrogen is suitably passed in contact with a suitable material composed mainly or essentially of nitrogen and an alkali metal, such as sodium or potassium, the nitrogen and hydrogen of the gaseous mixture are united to form ammonia.

When nitrogen and sodium are used as the catalytic agent, such agent is preferably prepared by suitably passing dry ammonia gas in contact with metallic sodium at a temperature of about 300° C., the sodium being distributed upon a suitable carrier. With a catalytic agent so prepared nitrogen and hydrogen may be caused to combine, with the production of ammonia at a temperature ranging from about 550° C. to about 600° C. and a pressure less than 100 atmospheres, for example, a pressure averaging about 85 atmospheres.

In order that my invention may be clearly understood, it is now set forth in the form of a specific example, it being understood, of course, that the invention is not to be limited to the exact materials or proportions thereof nor to the other conditions of the example, since these may be varied without departing from my invention.

*Example I—Preparing the catalyzer.—* Pumice stone in small pieces is purified by treatment with hydrochloric acid in the cold for about twenty-four hours; it is then washed with distilled water until free from chlorid and then ignited to dryness. Of this product of dry, granular, pumice stone, 100 grams are mixed with 46 grams of metallic sodium in an indifferent atmosphere, such as that of hydrogen, and the material is heated for the purpose of melting the sodium and distributing it over the surfaces of the pumice granules; the material is preferably stirred vigorously during this heating so as to aid in making the distribution of the sodium uniform. The indifferent atmosphere is then displaced by anhydrous ammonia vapor or gas and the material is heated to about 300° C. in a current of this ammonia vapor until a practically constant weight is obtained. The material after being cooled is preserved ready for use preferably in a dry atmosphere of ammonia.

The pumice stone acts as a carrier or support for the catalytic agent and may, of course, be replaced by any other suitable inert and heat resistant material, preferably one which is either porous or fibrous or both. Instead of the sodium an equivalent amount of potassium may be used and instead of the sodium or potassium followed by treatment with ammonia, sodium or potassium amid may be used.

*Example II—Utilizing the catalyzer to produce ammonia.—*For producing ammonia about 128 grams of the above sodium and nitrogen catalyzer, or a corresponding amount of its equivalent, are placed in a suitable catalytic chamber for ammonia synthesis and there is passed in contact with such catalyzer a gas current preferably containing one volume of nitrogen and three volumes of hydrogen. The gas mixture must be suitably purified and must be freed especially from contact poisons in the well known manner. With the pressure of the gas traversing the chamber within the range of 34 to 95 atmospheres and the temperature of treatment approximately between 550° and 600° C., I have succeeded in producing synthetic ammonia to the extent that the ammonia gas leaving the treating chamber constituted up to 5% by volume of the total gas leaving said chamber, this percentage depending upon the applied pressure. The ammonia is removed from the gas discharged from the catalytic chamber in any suitable manner.

I claim:

1. The herein described process of producing ammonia which comprises passing a gaseous mixture containing nitrogen and hydrogen in contact with a catalytic agent composed essentially of an alkali metal and nitrogen and distributed upon a suitable carrier.

2. The herein described process of producing ammonia which comprises passing a gaseous mixture containing nitrogen and hydrogen under pressure in contact with a heated catalytic agent composed essentially of an alkali metal and nitrogen and distributed upon a suitable carrier.

3. The herein described process of producing ammonia which comprises passing a gaseous mixture containing nitrogen and hydrogen under a pressure less than 100 atmospheres in contact with a heated catalytic agent composed essentially of an alkali metal and nitrogen and distributed upon a suitable carrier.

4. The herein described process of producing ammonia which comprises passing a gaseous mixture containing nitrogen and hydrogen in contact with a catalytic agent composed essentially of sodium and nitrogen and distributed upon a suitable carrier.

5. The herein described process of producing ammonia which comprises passing a gaseous mixture containing nitrogen and hydrogen under pressure in contact with a heated catalytic agent composed essentially of sodium and nitrogen and distributed upon a suitable carrier.

6. The herein described process of producing ammonia which comprises passing a gaseous mixture containing nitrogen and hydrogen under a pressure less than 100 atmospheres in contact with a heated catalytic agent composed essentially of sodium and nitrogen and distributed upon a suitable carrier.

7. The herein described process of producing ammonia which comprises passing a gaseous mixture containing nitrogen and hydrogen under pressure less than 100 atmospheres in contact with a heated catalytic agent obtainable from metallic sodium and gaseous ammonia and distributed upon a suitable carrier.

8. The herein described process of producing ammonia which comprises passing a gaseous mixture containing nitrogen and hydrogen in contact with a heated catalytic agent composed essentially of sodium and nitrogen and distributed upon a pumice.

9. The herein described process of producing ammonia which comprises passing a gaseous mixture containing nitrogen and hydrogen under a pressure less than 100 atmospheres in contact with a heated catalytic agent composed essentially of sodium and nitrogen and distributed upon pumice.

10. The herein described process of producing ammonia which comprises passing a gaseous mixture containing nitrogen and hydrogen under pressure less than 100 atmospheres in contact with a heated catalytic agent obtainable from metallic sodium and gaseous ammonia and distributed upon pumice.

In testimony whereof I have hereunto set my hand in the presence of two subscribing witnesses.

FREDRIK W. de JAHN.

Witnesses:
JOHN A. FERGUSON,
FRED A. KLEIN.